(12) United States Patent
Cheshire

(10) Patent No.: US 7,864,709 B2
(45) Date of Patent: Jan. 4, 2011

(54) METHOD AND APPARATUS FOR LOOKING UP CONFIGURATION INFORMATION FOR A NETWORK NODE

(75) Inventor: Stuart D. Cheshire, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1194 days.

(21) Appl. No.: 10/877,401

(22) Filed: Jun. 25, 2004

(65) Prior Publication Data

US 2005/0286514 A1 Dec. 29, 2005

(51) Int. Cl.
*H04L 12/28* (2006.01)
*G06F 15/16* (2006.01)
*G06F 15/177* (2006.01)

(52) U.S. Cl. .................. 370/255; 370/395.3; 709/219; 709/222

(58) Field of Classification Search .................. 370/254, 370/255, 395.3, 379; 709/220, 222, 219, 709/221, 217, 223, 226
See application file for complete search history.

(56) References Cited

U.S. PATENT DOCUMENTS

| | | | | |
|---|---|---|---|---|
| 6,092,178 | A * | 7/2000 | Jindal et al. | 712/27 |
| 6,167,449 | A * | 12/2000 | Arnold et al. | 709/227 |
| 6,324,582 | B1 * | 11/2001 | Sridhar et al. | 709/230 |
| 7,120,675 | B1 * | 10/2006 | Shupak et al. | 709/217 |
| 7,472,201 | B1 * | 12/2008 | Aitken | 709/245 |
| 2002/0099803 | A1 * | 7/2002 | Cheshire | 709/220 |
| 2003/0007482 | A1 * | 1/2003 | Khello et al. | 370/352 |
| 2004/0215707 | A1 * | 10/2004 | Fujita et al. | 709/201 |
| 2005/0005027 | A1 * | 1/2005 | Drouet et al. | 709/245 |

FOREIGN PATENT DOCUMENTS

EP 1 202 493 A2 5/2002

OTHER PUBLICATIONS

P. Mockapetris, "Domain Names—Implementation and Specification," Nov. 1987, Network Working Group, p. 5, 20-26, 37.*
H. Eidnes, "Classless IN-ADDR.ARPA Delegation," Mar. 1998, Network Working Group, p. 2, 4.*
M. Lotter, "RFC 1033: Domain Administrators Operations Guide," International Engineering Task Force, Nov. 1987.*
Publication: "DHCP Options and BOOTP Vendor Extensions" by S. Alexander et al., Network Working Group, Request for Comments: 2132, Obsoletes: 1533, Category: Standards Track, XP-002162747, pp. 1 to 33.

* cited by examiner

*Primary Examiner*—Man Phan
*Assistant Examiner*—Ryan C Kavleski
(74) *Attorney, Agent, or Firm*—Park, Vaughan, Fleming & Dowler LLP; Laxman Sahasrabuddhe

(57) ABSTRACT

One embodiment of the present invention provides a system for looking up location-specific configuration information for a network node or a subnet. During system operation, a network node creates a query message containing a key that comprises an Internet Protocol (IP) prefix and a string, wherein the IP prefix identifies the network node or the subnet, and the string specifies the type of configuration information. The network node then sends the query message to a name server, which is part of a distributed system that provides a global naming service, wherein the name server additionally stores configuration information. Finally, the network node receives a response message from the name server, wherein the response message contains the requested configuration information.

16 Claims, 3 Drawing Sheets

METHOD AND APPARATUS FOR LOOKING UP CONFIGURATION INFORMATION FOR A NETWORK NODE

BACKGROUND

1. Field of the Invention

The present invention relates to the process of looking up configuration information for a network node. More specifically, the present invention relates to the process of looking up configuration information for a network node by sending a query message to a name server, which is part of a distributed system that provides a global naming service.

2. Related Art

The Internet is permeating more and more aspects of our lives—from buying cameras to buying real estate, and from reading a newspaper to watching a movie.

Due to the Internet's complexity, a network node, such as a computer, that wants to participate in the Internet needs to lookup a large amount of configuration information. For example, a network node typically needs to look up the name of an e-mail server, before it can send or receive e-mail.

The configuration information that a network node needs to lookup tends to be location specific. For example, the name of an e-mail server for a network node in an organization can be different from the name of an e-mail server for another network node within the same organization. Furthermore, it is cumbersome to ask the user to lookup the configuration information. Hence, there is a strong need for a mechanism that allows a network node to automatically lookup configuration information on its own.

DHCP (Dynamic Host Configuration Protocol) is a commonly-used protocol that was designed to automatically assign IP addresses to network nodes. It has subsequently been extended to allow a network node to lookup configuration information. Today, many network nodes use DHCP for looking up configuration information.

Unfortunately, there are many drawbacks in using DHCP for looking up configuration information. Since DHCP is typically used only once during system boot, the network node gets only one chance to lookup configuration information. This is a severe limitation, because it forces the network node to guess what kind of configuration information it is going to need in the future. For example, if the network node does not lookup the NetBIOS (Network Basic Input Output System) name server during system boot, the network node may not be able to provide this information to an application that requires this information during normal system operation, thereby preventing the application from running properly.

Furthermore, since configuration information can change over time, the configuration information that was obtained using DHCP during system boot can be out of date.

Note that, although it is possible to use DHCP to lookup configuration information during normal system operation, such lookup operations may not be supported by all DHCP servers. Moreover, performing a lookup during normal system operation may cause the DHCP server to assign a new IP address to the network node, which can cause many applications to malfunction.

Furthermore, DHCP can only support up to 255 types of configuration information, which places a hard limit on the types of configuration information that can be looked up using DHCP.

In addition, one of the benefits of IPv6 is that it allows a network node to configure IPv6 addresses for its interfaces without requiring a DHCP server. This is beneficial because it reduces the burden on network operators by reducing the number of servers they need to maintain. However, if network operators have to continue using DHCP servers even after upgrading to IPv6, one of the important advantages of using IPv6 will be eliminated.

Hence, what is needed is a method and apparatus for looking up a wide range of location-specific configuration information for a network node, wherein the method and apparatus does not have the drawbacks described above.

SUMMARY

One embodiment of the present invention provides a system for looking up location-specific configuration information for a network node or a subnet. During system operation, a network node creates a query message containing a key that comprises an Internet Protocol (IP) prefix and a string, wherein the IP prefix identifies the network node or the subnet, and the string specifies the type of configuration information. The network node then sends the query message to a name server, which is part of a distributed system that provides a global naming service, wherein the name server additionally stores configuration information. Finally, the network node receives a response message from the name server, wherein the response message contains the requested configuration information.

In a variation on this embodiment, a name server receives a query message from a network node, wherein the query message contains a key that comprises an IP prefix and a string, wherein the IP prefix identifies a network node or a subnet, and the string specifies the type of configuration information. The name server then looks up the configuration information in a configuration database using the key. Finally, the name server sends a response message to the network node, wherein the response message contains the configuration information.

In a variation on this embodiment, the IP prefix can include all of the bits of an IP address.

In a variation on this embodiment, the key is created by first reversing the bytes of the IP prefix, and representing the reversed bytes of the IP prefix as a string. Next, a string that specifies the type of configuration information is prepended to the reversed-IP-prefix string. Finally, the string ".in-addr.arpa." is appended to the resulting string to form the entire key.

In a variation on this embodiment, the name server belongs to the Domain Name System (DNS).

In a variation on this embodiment, the query message can be a DNS-query message.

In a variation on this embodiment, the response message can be a DNS-response message.

In a variation on this embodiment, the IP prefix can be an IP version 4 prefix or an IP version 6 prefix.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (Compact Discs) and DVDs (Digital Versatile Discs or Digital Video Discs), and computer instruction signals embodied in a transmission medium (with or without a carrier wave upon which the signals are modulated). For example, the transmission medium may include a communications network, such as the Internet.

Network

Figure 1:
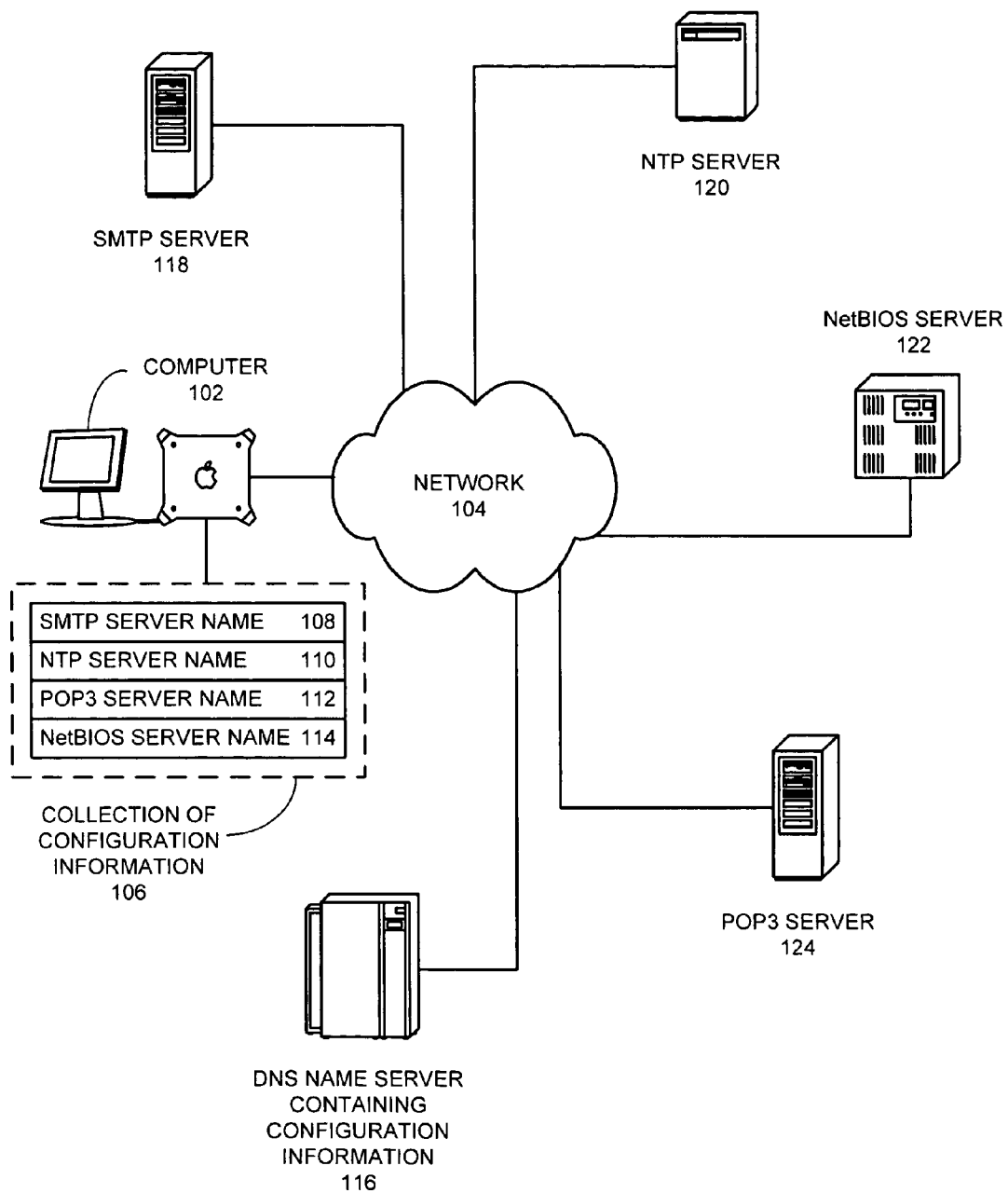
FIG. 1 illustrates a network that is connected to multiple network nodes, namely, a computer, an SMTP (Simple Mail Transfer Protocol) server, an NTP (Network Time Protocol) server, an NetBIOS (Network Basic Input Output System) server, a POP3 (Post Office Protocol 3) server, and a DNS (Domain Name System) name server containing configuration information in accordance with an embodiment of the present invention.

FIG. 1 illustrates a network 104 that is connected to multiple network nodes, namely, a computer 102, an SMTP (Simple Mail Transfer Protocol) server 118, an NTP (Network Time Protocol) server 120, an NetBIOS (Network Basic Input Output System) server 122, a POP3 (Post Office Protocol 3) server 124, and a DNS (Domain Name System) name server containing configuration information 116 in accordance with an embodiment of the present invention.

Network 104 can generally include any type of wire or wireless communication channel capable of coupling together network nodes. This includes, but is not limited to, a local area network, a wide area network, or a combination of networks. In one embodiment of the present invention, network 104 includes the Internet.

A network node, such as a computer 102, can generally include any type of communication device capable of communicating with other network nodes via a network. This includes, but is not limited to, a computer system based on a microprocessor, a mainframe computer, a server, a printer, a video camera, an external disk drive, a router, a switch, a personal organizer, and a mobile phone.

Network 104 allows a source network-node, such as a computer 102, to communicate with a target network-node, such as an SMTP server 118. But, before the communication can take place, the source network-node, computer 102, needs to know the name or the IP address of the target network-node, SMTP server 118. Typically, such configuration information can be obtained by computer 102 using DHCP during system boot and can be stored for later use.

Configuration Information

FIG. 1 illustrates a collection of configuration information 106 that can be stored on a computer 102 in accordance with an embodiment of the present invention. This collection of configuration information 106 includes one or more pieces of configuration information, such as, an SMTP server name 108, an NTP server name 110, a POP3 server name 112, and a NetBIOS server name 114. Among other uses, collection of configuration information 106 allows computer 102 to provide various services to its users. For example, computer 102 can use the SMTP server name 108, which is part of collection of configuration information 106, to communicate with the SMTP server 118, thereby providing e-mail services to its end users.

Structure of a DNS Packet

Figure 2:
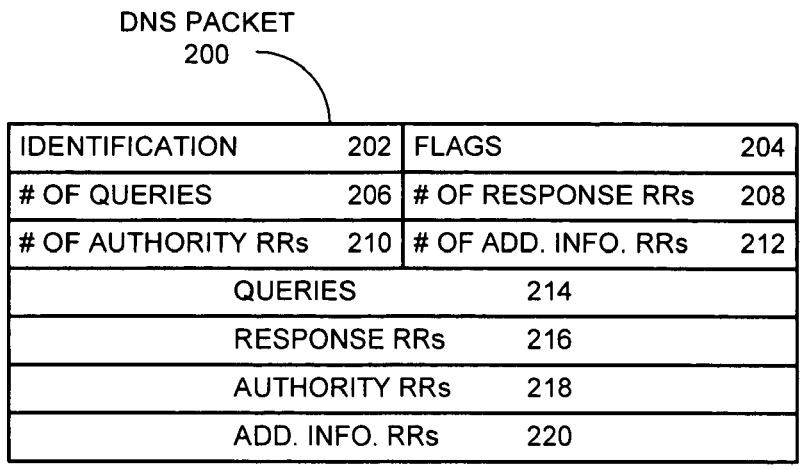
FIG. 2 illustrates a DNS packet that contains multiple pieces of information that can be used by a network node, such as a computer, to exchange information with a DNS name server in accordance with an embodiment of the present invention.

FIG. 2 illustrates a DNS packet 200 that contains multiple pieces of information that can be used by a network node, such as a computer 102, to exchange information with a DNS name server 116 in accordance with an embodiment of the present invention.

DNS-query packets and DNS-response packets both use the same DNS packet format. Specifically, a DNS packet 200 contains an identification field 202, which allows a network node, such as a computer 102, to match queries to the corresponding responses. DNS packet 200 also contains a flags field 204, which among other things, indicates whether the DNS packet 200 is a query or a response.

Furthermore, DNS packet 200 contains four variable-length fields, namely, queries 214, response resource-records 216, authority response-records 218, and additional information response-records 220. These variable-length fields are used for exchanging information between a network node, computer 102, and a DNS name server 116.

Additionally, DNS packet 200 contains four other fields, namely, a number of queries field 206, a number of response resource-records field 208, a number of authority resource-records field 210, and a number of additional information resource-records field 212, which specify the number of entries in the four variable-length fields.

Structure of a Query

Figure 3:
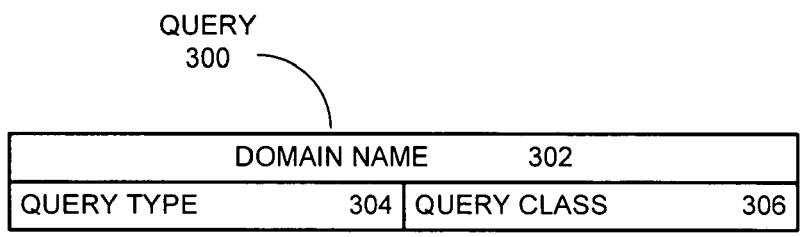
FIG. 3 illustrates the structure of a query that makes up the queries field in a DNS packet in accordance with an embodiment of the present invention.

FIG. 3 illustrates the structure of a query 300 that makes up the queries field 214 in accordance with an embodiment of the present invention. Query 300 contains a domain name field 302, which specifies the domain name that is being queried. Furthermore, query 300 includes a query type field 304, and a query class field 306, which specifies the type and the class of the query 300, respectively.

Structure of a Resource Record

Figure 4:
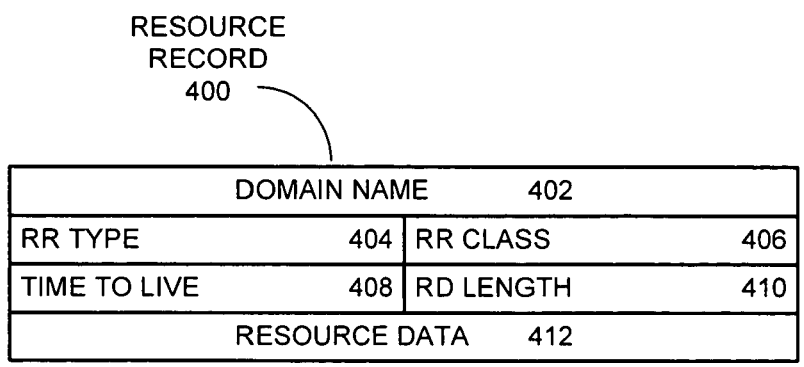
FIG. 4 illustrates the structure of a resource record that can be used by the DNS name server to provide information in response to a query in accordance with an embodiment of the present invention.

FIG. 4 illustrates the structure of a resource record 400 that can be used by a DNS name server 116 to provide information in response to a query in accordance with an embodiment of the present invention.

Specifically, resource record 400 contains a domain name field 402, which specifies the domain name under consideration. Resource record 400 also contains a resource-record type field 404 and a resource-record class field 406, which specifies the type and class of the resource record, respectively. Additionally, resource record 400 includes a time to live field 408, which specifies the amount of time (in seconds) that the resource record can be cached by a network node, such as a computer 102. Furthermore, resource record 400 contains a resource data field 412, which is a variable-length field that can be used by DNS name server 116 to provide information to the network node, computer 102, in response to a query. Resource record 400 also contains a resource data length field 410, which specifies the amount of data in the variable-length resource data field 412.

Process of Looking Up Configuration Information

Figure 5:
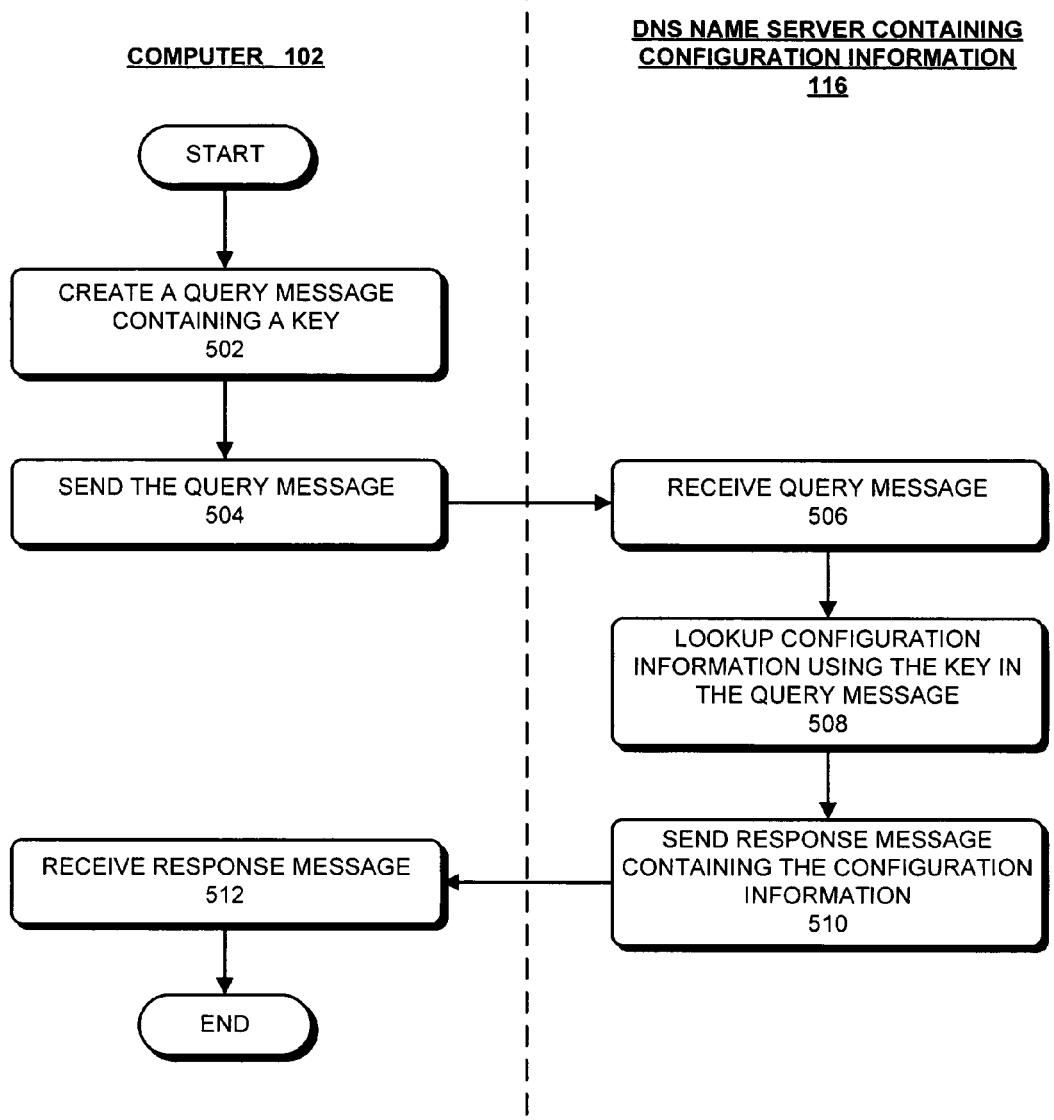
FIG. 5 presents a flowchart illustrating a process that a network node, such as a computer, can use to lookup configuration information by querying a DNS name server containing configuration information in accordance with an embodiment of the present invention.

FIG. 5 presents a flowchart illustrating the process that a network node, such as a computer 102, can use to lookup configuration information by querying a DNS name server containing configuration information 116 in accordance with an embodiment of the present invention.

First, computer 102 creates a DNS-query packet 200, which includes a query 300 containing a key (step 502). More specifically, the domain name 302 in the query 300 comprises the key, which is created by first reversing the bytes of the IP prefix and representing the reversed IP-prefix as a string. Next, a string that specifies the type of configuration information is prepended to the reversed-IP-prefix string. Finally, the string ".in-addr.arpa." is appended to the resulting string form the entire key. Note that the string ".in-addr.arpa." represents a special domain in DNS that is used for address-to-name mappings.

For example, if the computer 102, whose IP address is 17.255.12.34 with subnet mask 255.255.0.0, wants to lookup the NTP server name 110, it would create a query 300 with domain name 302 that contains the key "4.dhcpopt.255.17.in-addr.arpa", wherein "4.dhcpopt." is a string that specifies the type of configuration information, "255.17" is a string representation of the reversed IP-prefix, and ".in-addr.arpa." is the appended string. Note that, the string "4.dhcpopt." refers to DHCP option 4, which corresponds to the NTP server name, as defined in IETF (Internet Engineering Task Force) RFC (Request for Comments) 2132. It will be readily apparent to one skilled in the art that every DHCP option defined in IETF RFC 2132 can be similarly converted into a string that specifies the type of configuration information.

Next, the computer sends the DNS-query packet 200 (step 504) to a DNS name server containing configuration information 116. The DNS name server containing configuration information 116 then receives the DNS-query packet 200 (step 506). Next, the DNS name server containing configuration information 116 looks up the configuration information in its database using the key in the query (step 508), which is contained in the DNS-query packet 200. The DNS name server containing configuration information 116 then sends a response message containing the configuration information (step 510). Finally, computer 102 receives the response message (step 512) containing the configuration information, thereby allowing computer 102 to use the configuration information to perform its task.

Furthermore, a network node, such as a computer 102, can send multiple queries to the DNS name server containing configuration information 116 to lookup configuration information at different levels of granularity. For example, the network node can send a query containing the key "4.dhcpopt.34.12.255.17.in-addr.arpa" to find host-specific configuration that applies to that host alone. On the other hand, the network node can send a query containing the key "4.dhcpopt.255.17.in-addr.arpa" to find subnet-specific configuration information that applies to all network nodes on that subnet. Moreover, the network node can send a query containing the key "4.dhcpopt.17.in-addr.arpa" to find company-wide configuration information that applies uniformly to all the network nodes in a company.

Note that DNS was designed so that network nodes could query it during normal system operation. Hence, by using DNS instead of DHCP to store configuration information, the present invention overcomes one of the limitations of DHCP, in which the network node was restricted to lookup configuration information during system boot only. Furthermore, a network node can keep its configuration information up to date by periodically querying a DNS name server containing configuration information. Moreover, in the present invention, the type of configuration information is specified by an arbitrary string, such as "4.dhcpopt.". Hence, the present invention can potentially support infinite types of configuration information, whereas DHCP can support only up to 255 types of configuration information.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for looking up location-specific configuration information for a network node, the method comprising:
    creating a Domain Name System (DNS) query packet at the network node, wherein the DNS query packet includes a DNS query field which includes the network node's address or the network node's subnet, wherein the DNS query field specifies a first service which is desired to be configured at the network node, and wherein the first service enables the network node to request a server to perform operations;
    sending the DNS query packet to a DNS server, wherein the DNS server is part of a distributed system which is designed to provide a name resolution service;
    receiving a DNS response packet from the DNS server, wherein the DNS response packet includes a first server's address, wherein the first server provides the first service which is desired to be configured at the network node; and
    storing the first server's address at the network node, thereby configuring the first service at the network node.

2. The method of claim 1, wherein the network node's address is one of:
    a string representation of one or more bits of the network node's Internet Protocol (IP) version 4 address; or
    a string representation of one or more bits of the network node's IP version 6 address.

3. The method of claim 1, wherein the DNS query field contains a key that is created by:
    prepending a configuration-identifier to the network node's address or the network node's subnet to obtain a query string, wherein the configuration-identifier is associated with the first service, and
    appending ".in-addr.arpa." to the query string.

4. A method for looking up location-specific configuration information for a network node, the method comprising:
    receiving a Domain Name System (DNS) query packet at a DNS server from the network node, wherein the DNS query packet includes a DNS query field which includes the network node's address or the network node's subnet, wherein the DNS query field specifies a first service which is desired to be configured at the network node, and wherein the first service enables the network node to request a server to perform operations;

looking up a first server's address in the DNS server's database, wherein the first server provides the first service which is desired to be configured at the network node; and sending a DNS response packet to the network node which includes the first server's address, wherein sending the DNS response packet to the network node causes the network node to store the first server's address, thereby configuring the first service at the network node.

5. The method of claim 4, wherein the network node's address is one of:
   a string representation of one or more bits of the network node's Internet Protocol (IP) version 4 address; or
   a string representation of one or more bits of the network node's IP version 6 address.

6. The method of claim 4, wherein looking up the first server's address in the DNS server's database involves accessing one or more resource-records.

7. A non-transitory computer-readable storage medium storing instructions that when executed by a computer cause the computer to perform a method for looking up location-specific configuration information for a network node, the method comprising:
   creating a Domain Name System (DNS) query packet at the network node, wherein the DNS query packet includes a DNS query field which includes the network node's address or the network node's subnet, wherein the DNS query field specifies a first service which is desired to be configured at the network node, and wherein the first service enables the network node to request a server to perform operations;
   sending the DNS query packet to a DNS server, wherein the DNS server is part of a distributed system which is designed to provide a name resolution service;
   receiving a DNS response packet from the DNS server, wherein the DNS response packet includes a first server's address, wherein the first server provides the first service which is desired to be configured at the network node; and
   storing the first server's address at the network node, thereby configuring the first service at the network node.

8. The computer-readable storage medium of claim 7, wherein the network node's address is one of:
   a string representation of one or more bits of the network node's Internet Protocol (IP) version 4 address; or
   a string representation of one or more bits of the network node's IP version 6 address.

9. The computer-readable storage medium of claim 7, wherein the DNS query field contains a key that is created by:
   prepending a configuration-identifier to the network node's address or the network node's subnet to obtain a query string, wherein the configuration-identifier is associated with the first service, and
   appending ".in-addr.arpa." to the query string.

10. A non-transitory computer-readable storage medium storing instructions that when executed by a computer cause the computer to perform a method for looking up location-specific configuration information for a network node, the method comprising:
    receiving a Domain Name System (DNS) query packet at a DNS server from the network node, wherein the DNS query packet includes a DNS query field which includes the network node's address or the network node's subnet, wherein the DNS query field specifies a first service which is desired to be configured at the network node, and wherein the first service enables the network node to request a server to perform operations;
    looking up a first server's address in the DNS server's database, wherein the first server provides the first service which is desired to be configured at the network node; and
    sending a DNS response packet to the network node which includes the first server's address, wherein sending the DNS response packet to the network node causes the network node store the first server's address, thereby configuring the first service at the network node.

11. The computer-readable storage medium of claim 10, wherein the network node's address is one of:
    a string representation of one or more bits of the network node's Internet Protocol (IP) version 4 address; or
    a string representation of one or more bits of the network node's IP version 6 address.

12. The computer-readable storage medium of claim 10, wherein looking up the first server's address in the DNS server's database involves accessing one or more resource-records.

13. An apparatus used for looking up location-specific configuration information for a network node, the apparatus comprising:
    a creating mechanism configured to create a Domain Name System (DNS) query packet at the network node, wherein the DNS query packet includes a DNS query field which includes the network node's address or the network node's subnet, wherein the DNS query field specifies a first service which is desired to be configured at the network node, and wherein the first service enables the network node to request a server to perform operations;
    a sending mechanism configured to send the DNS query packet to a DNS server, which is part of a distributed system which is designed to provide a name resolution service;
    a receiving mechanism configured to receive a DNS response packet from the DNS server, wherein the DNS response packet includes a first server's address, wherein the first server provides the first service which is desired to be configured at the network node; and
    a storing mechanism configured to store the first server's address at the network node, thereby configuring the first service at the network node.

14. The apparatus of claim 13, wherein the network node's address is one of:
    a string representation of one or more bits of the network node's Internet Protocol (IP) version 4 address; or
    a string representation of one or more bits of the network node's IP version 6 address.

15. The apparatus of claim 13, wherein the DNS query field contains a key that is created by:
    prepending a configuration-identifier to the network node's address or the network node's subnet to obtain a query string, wherein the configuration-identifier is associated with the first service, and
    appending ".in-addr.arpa." to the query string.

16. An apparatus for looking up location-specific configuration information for a network node, the apparatus comprising:
    a receiving mechanism configured to receive a Domain Name System (DNS) query packet at a DNS server from the network node, wherein the DNS query packet includes a DNS query field which includes the network node's address or the network node's subnet, wherein the DNS query field specifies a first service which is desired to be configured at the network node, and wherein the first service enables the network node to request a server to perform operations;

a looking up mechanism configured to look up a first server's address in the DNS server's database, wherein the first server provides the first service which is desired to be configured at the network node; and a sending mechanism configured to send a DNS response packet to the network node which includes the first server's address, wherein sending the DNS response packet to the network node causes the network node to store the first server's address, thereby configuring the first service at the network node.

* * * * *